United States Patent
Cowan

[15] 3,701,552
[45] Oct. 31, 1972

[54] COMPOSITE CONSTRUCTION FOR NIPPLE USED IN GROUND STARTING FOR JET ENGINES

[72] Inventor: Arnold A. Cowan, Tarzana, Calif.
[73] Assignee: Bobrick Aero Missile Products, Hollywood, Calif.
[22] Filed: Oct. 19, 1970
[21] Appl. No.: 81,645

[52] U.S. Cl. ............... 285/158, 285/173, 285/403
[51] Int. Cl. .......................................... F16l 3/04
[58] Field of Search......285/173, 329, 158, 184, 399, 285/403, 404

[56] References Cited

UNITED STATES PATENTS

| 3,297,344 | 1/1967 | Hanes | 285/403 X |
| 3,415,546 | 12/1968 | Rubner et al. | 285/173 |
| 3,425,452 | 2/1969 | Shaw | 285/158 X |
| 3,536,138 | 10/1970 | Laska | 285/420 |

Primary Examiner—Dave W. Arola
Attorney—Mahoney, Hornbaker & Schick

[57] ABSTRACT

A nipple construction particularly adapted for use in aircraft cooperative with a corresponding coupling wherein optimum structural and durability characteristics, consistent with minimum weight design criteria, are obtained by the incorporation in said nipple of a first member of lightweight metal having a second member or sleeve of greater wear resistance and structural strength encompassing said first member and imparting said wear resistance and structural strength to a majority of the external surface of said nipple by acting as a buffer to absorb wear and impact arising out of the many connect and disconnect operations to which nipples of this type are usually subjected.

6 Claims, 2 Drawing Figures

PATENTED OCT 31 1972 3,701,552

INVENTOR.
ARNOLD A. COWAN
BY MAHONEY, HORNBAKER
AND SCHICK
ATTORNEYS

COMPOSITE CONSTRUCTION FOR NIPPLE USED IN GROUND STARTING FOR JET ENGINES

BACKGROUND OF THE INVENTION

This invention pertains to connector constructions for use in areas where weight and wear features are particularly important. Specifically this invention pertains to a composite construction for nipples used in ground starting for jet engines. Aircraft are provided with a number of connectors which provide connections between internal systems and portable ground systems used on a temporary basis for one reason or another. The particular type of connector contemplated and found ideal for this practice of the invention is one that is used for the starting of jet engines.

For Example, jet engines may be started with pressure and thus it is necessary to make connection to a suitable fluid supply source. One means of pressure starting is to connect an air source to a fluid line communicating with the chamber or component which must be pressurized. This function obviously is only conducted on the ground and so as to keep the aircraft weight to a minimum, a portable ground pressure source is made available having quick connect and disconnect facilities to accomplish the pressurizing necessary for engine ignition. There are a plurality of such connectors or nozzles used in aircraft and it thus becomes becessary to have connectors which permit the optimization of structural and wear strengths necessary for the multitude of quick-connect and-disconnect operations all consistent with minimum weight criterion normally associated with aircraft.

Thus in the practice of this invention, an adapter or first member which comprises the main body element is secured to a structure or fuselage of the aircraft and serves as the main connector between the service duct and the starting system duct. This member is made of high temperature, high strength aluminum alloy in order to minimize weight consistent with cost and other factors. The second member of the structures of this invention comprises a sleeve or wear member which ensheaths a major portion of the adapter or main body component and is fabricated of high strength steel to take the impact and wear imposed by the heavy quick connect and disconnect fittings of the flexible service duct which connects the aircraft system with the portable ground system.

Heretofore the prior art has been faced with the proposition of providing either all aluminum fittings which are unable to bear up under the severe conditions in which they are used or alternately use prohibitive all steel fittings which likewise are unsuitable because of the weight factors involved. The connector constructions of this invention overcome these shortcomings and provide alternatives heretofore unavailable in the prior art which maximize the best features of either extremes without sacrificing needed performance.

OBJECTS AND SUMMARY OF THE INVENTION

It is an object of this invention to provide a connector construction of lightweight and high strength characteristics.

It is another object of this invention to provide a connector construction for use in aircraft or the like employing a composite nipple structure.

It is still another object of this invention to provide a composite construction connector for use in ground starting of jet engines.

It is still another more specific object of this invention to provide a connector for jet engines or other aircraft systems for temporary connection with portable ground systems.

It is still another more specific object of this invention to provide a composite connector construction wherein a first member is fabricated of lightweight aluminum and is partially ensheathed in an external high strength steel member being adapted for quick connect and disconnect attachment with a ground support system.

Other objects and advantages of the invention will be apparent from the following specification and the accompanying drawing which is for the purpose of illustration only.

In an exemplary embodiment, the invention pertains to a connector construction for aircraft and the like comprising a first member of lightweight material having an extending, generally tubular end defining an outer edge and having an integrally formed flanged opposite end adapted for attachment to the fuselage of an aircraft or the like, said tubular end being provided with at least one exterior shoulder. A second member of high-strength material exterior of said first member and defining a sleeve therefor is provided in relatively rigid relationship with said first member. One end of said second member is adapted to extend over said at least one exterior shoulder with the other end extending beyond said extending generally tubular end and is provided with an internally formed shoulder abutting said outer edge of said first member and is of a configuration adapted for quick connect and disconnect interfitting engagement with a fluid line coupling.

Figure 1:
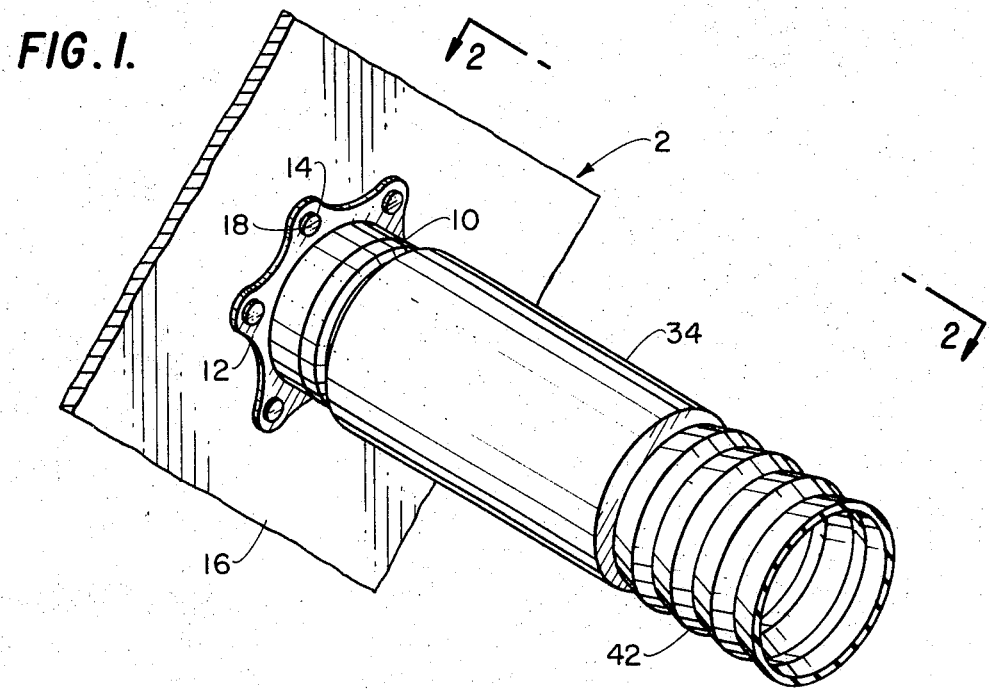
FIG. 1 is a perspective view showing the field of use of the connector construction of this invention.

DESCRIPTION OF THE BEST EMBODIMENTS CONTEMPLATED:

Referring to the drawings wherein like numerals of reference designate like elements throughout, the invention will be described as it specifically pertains to a nipple or connector used in ground starting for jet engines wherein it is desired to put the system of the jet engine in communication with a ground, mobile apparatus for pressure starting of the jet engine. It is, of course, obvious that other fields of use specific to aircraft and outside of the aircraft field are possible. In other words, the structures disclosed herein may be used for providing quick-connect-and-disconnect connectors for ground air conditioning systems which provide air conditioning facilities for aircraft while they are on the ground, or similar such usages, when desirable to interconnect aircraft systems with portable ground systems on a temporary basis.

Herein the connector 2 is shown comprising a first tubular member 4 having an extending portion 6 defining an outer edge 8 with an opposite end 10 having an integrally formed flange 12, in this instance of lobate configuration and being provided with a plurality of apertures 14 by which means the connector 2 may be secured to the wall or fuselage 16 of an aircraft or aircraft engine and the like. Rivets 18 provide securement between the connector 2 and the fuselage 16. Generally speaking, the first member 4 has a first major bore 4a and a second major bore 4b being slightly larger in diameter than the bore 4a. The member 4 is provided with at least one exterior shoulder such as 20 and a second spaced shoulder 22 of less depth than the shoulder 20 may also be provided. The exterior wall of the member 4 defining shoulders 20 and 22 is normal to the axis of member 4 thereby providing abutting surfaces for reasons which will become apparent hereinafter. The outer edge or extremity 4c of member 4 is lightly bevelled or coined for reasons to be described while the wall of the member 4, inward of the edge 4c, is provided with, in this instance, three spaced apertures 24 about 120° apart for reasons which will be described. The material of construction for member 4 is of high-temperature resistant and high strength lightweight aluminum alloy which can withstand flow of air therethrough at about 50–60 p.s.i. at a temperature of about 400°–600° F. for the specific embodiment contemplated. Obviously, other lightweight metals with appropriate characteristics depending upon use may be used.

The second member or component of the connector 2 comprises sleeve or sheath member 30, in this instance of a corrosion resistant steel being capable of with-standing rugged use and absorbing connector-type impacts. The sleeve 30 is of a size and shape to accommodate a majority of the external peripheral surface of member 4 and has an internal configuration to receive the shoulder 20 and the edge 8 in abutting relationship, the exterior surface 32 being of a configuration adapted to accommodate quick-connect and-disconnect fluid couplings such as coupling member 34. Three apertures 36 spaced about 120° apart are provided in the wall of member 30 in aligned relationship with the apertures 24 of member 4. Rivets 38 are disposed in the aligned holes 36 and 24 rigidly holding members 30 and 4 in relatively rigid relationship so that there is no axial or rotational movement between each of the members. Obviously, other modes of securement may be used.

It will be noted that member 30 extends outwardly from the edge 8 of member 4 a sufficient distance so as to absorb axial forces or impacts imposed upon member 30 by the coupling action with coupling 34 and to thereby isolate, in a non-transmission of forces manner, the member 4. The interior wall 30a of the sleeve 30 is tapered at 46 to conform to the coined edge or extremity 4c of the member 4 and to provide a smooth flow path for fluids flowing through the connector 2.

In this instance, fluid path 40 is in communication with a jet engine or the like which must be started. Air pressure acting against the engine blades provides the starting force. The protective cover (not shown) normally covering the connector 2 is removed and the coupling 34 snapped into engagement over sleeve 30 to thereby put the internal chambers or components of the engine in fluid communication with, for instance, a pressure source connected to fluid coupling 34 by means of hose 42. Thus it is apparent that after the engine has been started, the coupling 34 is easily removed and the normal cover replaced over member 30 to thereby seal off the connector 2 from the ambient atmosphere. If desired, the external surface of member 30 may be provided with cover retaining shoulders such as 30b so that a cover, such as polyethylene one, may be frictionally inserted over the protrusion 30b in a frictionally held, snap-fit manner.

Figure 2:
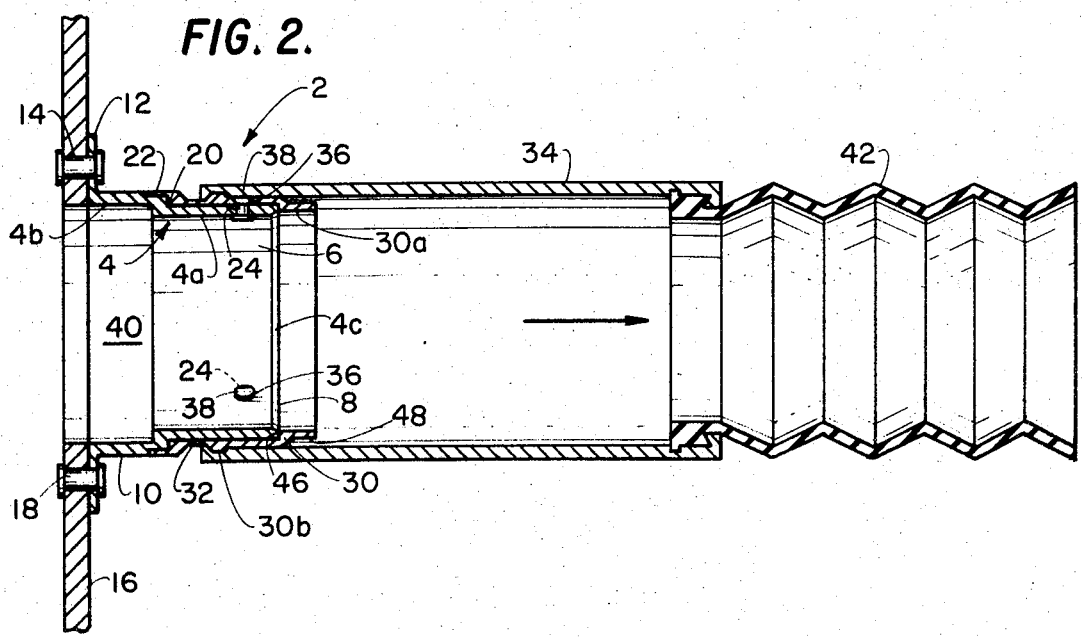
FIG. 2 is a view in partial cross-section taken along the lines 2—2 of FIG. 1.

Although the coupling 34 is shown schematically in FIGS. 1 and 2 of the drawings, the actual couplings utilized are provided with spring-actuated dogs, detents or the like which scrape across the exposed surface of the second member of sleeve 30 as the coupling 34 is moved axially across said surface. However, the wear resistant characteristics of the steel or other material from which the sleeve 30 is fabricated prevents high frictional wear of the surface of the sleeve 30 by the spring biased dogs or detents which occurs in conventional aluminum connectors.

Furthermore, when the coupling 34 is first installed in operative relationship with the nipple 2, the coupling 34 is frequently jammed into the outermost extremity 48 of the sleeve 30. This induces severe axial loads which are distributed into the first member 4 of the connector or nipple 2 through the cooperative shoulders 20 and 22 provided on the exterior surface of the first member 4 of the connector or nipple 2.

Since the greatest proportion of the composite connector of nipple 2 is constituted by the lightweight first member 4, significant reduction in weight is achieved and where a relatively large number of these couplings is utilized in the aircraft, a significant overall weight reduction is accomplished. Furthermore, the necessity for replacement of the connectors or nipples 2 is obviated because of the provision of the high wear and abuse resistant sleeve 30 in cooperative relationship with the first member 4.

Thus, a nipple connector or the like has been disclosed which is a composite adapted to meet aircraft criteria in that it is of lightweight construction yet provided with an exterior sleeve of high strength material which will wear well and absorb coupling impacts without damaging the lightweight member making up the composite.

I claim:

1. In a connector construction for aircraft and the like, the combination of: a first member of light-weight material as compared to a second member hereinafter defined, having smooth walls and an extending generally tubular end defining an outer edge and having an integrally-formed opposite end adapted for attachment to an aircraft, said tubular end being provided with two external shoulders; and a second member secured to said first member and being of high-strength material, as compared to said first member, having a first end portion exterior of said first member thereby defining a smooth-walled sleeve of larger exterior diameter than the portion of said first member it ensheaths, and a second end portion extending generally beyond said generally tubular end of said first member and having an internally formed shoulder directly abutting said outer edge of said first member and being adapted for quick connect and disconnect interfitting engagement with a fluid line coupling, said first end portion of said second member being in direct abutting engagement with said two external shoulders of said first member, all said abutting shoulders acting to absorb axial impact forces and to thereby minimize the transmission per unit area thereof to said first member.

2. The connector in accordance with claim 1 wherein said external shoulders are normal to the axis of said second member and said opposite end is flanged for ready securement to a support structure.

3. The connector in accordance with claim 1 wherein said first and second members are secured to each other by a plurality of spaced rivets.

4. The connector in accordance with claim 3 wherein three rivets spaced 120° apart secure said first and second members together.

5. The connector in accordance with claim 4 wherein said internally formed shoulder is at a right angle to said edge of said first member.

6. The connector in accordance with claim 5 wherein said second member defining said sleeve ensheaths a majority of the exterior surface of said first member.

* * * * *